United States Patent [19]

MacDonald

[11] 3,855,183
[45] Dec. 17, 1974

[54] 1,2,5-THIADIAZOLE POLYMERS

[75] Inventor: Robert Neal MacDonald, Wilmington, Del.

[73] Assignee: E. I. du Pont de Nemours and Company, Wilmington, Del.

[22] Filed: Aug. 27, 1973

[21] Appl. No.: 391,526

Related U.S. Application Data

[60] Division of Ser. No. 237,555, March 23, 1972, Pat. No. 3,786,028, which is a continuation-in-part of Ser. No. 866,401, Oct. 14, 1969, Pat. No. 3,664,986.

[52] U.S. Cl......... 260/78.3 R, 260/47 R, 260/75 N, 260/77.5 AQ, 260/79

[51] Int. Cl............................................. C08g 17/02
[58] Field of Search............................... 260/78.3 R

[56]  References Cited
UNITED STATES PATENTS
3,117,972  1/1964  Ross et al. ...................... 260/302

*Primary Examiner*—Melvin Goldstein

[57]  ABSTRACT

Disclosed herein are polymers containing 1,2,5-thiadiazole rings in the polymer chain and their preparations. The polymers are capable of being made into films, fibers, coatings and molded objects.

3 Claims, No Drawings

1,2,5-THIADIAZOLE POLYMERS

CROSS-REFERENCE TO RELATION APPLICATION

This is a division of copending application Ser. No. 237,555, filed Mar. 23, 1972 now U.S. Pat. No. 3,786,028 which in turn is a continuation-in-part of application Ser. No. 866,401, filed Oct. 14, 1969, now U.S. Pat. No. 3,664,986.

BACKGROUND OF THE INVENTION

1. Field of the Invention

This invention is concerned with polymers containing 1,2,5-thiadiazole rings in the polymer chain and the preparation of such polymers by condensation polymerization procedures.

2. Description of Prior Art

Certain of the intermediates that can be used to make the novel polymers are known compounds, e.g., 1,2,5-thiadiazole-3,4-dicarboxylic acid, the corresponding dicarbonyl chloride and dinitrile, and 3-hydroxy-1,2,5-thiadiazole-4-carboxylic acid [U.S. Pat. No. 2,990,409; U.S. Pat. No. 3,068,238; U.S. Pat. No. 3,117,972; Pesin, et al., Zhurnal Obshchei Khimie, 32, 3505 (1962)].

SUMMARY AND DETAILS OF THE INVENTION

The invention encompasses a polymer containing 1,2,5-thiadiazole rings in the polymer chain. Such a polymer chain can be described as containing recurring divalent 1,2,5-thiadiazole-3,4-diyl groups, represented by the formula

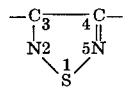

Preferred embodiments are polyesters, polyethers and poly(amide-urethanes). These preferred polymers are represented by the general forumla

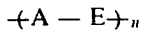

in which A represents the divalent 1,2,5-thiadiazole-3,4-diyl group, $n$ is the number of recurring units in the polymer chain and E is at least one divalent radical selected from the group:

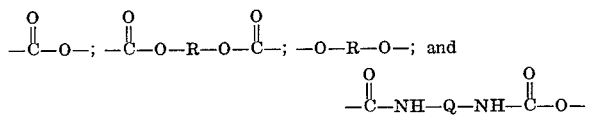

wherein
  Q is arylene or alkarylene of up to 12 carbon atoms, and
  R is selected from the group
  A. alkylene of 2 to 20 carbons,
  B. phenylene of the formula

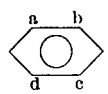

wherein $a$, $b$, $c$, and $d$ are hydrogen, alkyl, aryl, alkoxy, halogen, nitro or nitrile and wherein the two remaining bonds each attached to an oxygen in the polymer chain are ortho, meta or para to each other, C. cyclohexylene of the formula

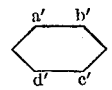

wherein the ring is saturated and the substituents $a'$, $b'$, $c'$ and $d'$ are hydrogen, alkyl, cycloalkyl, alkoxy or halogen, and the two remaining bonds each attached to an oxygen in the polymer chain are ortho, meta or para to each other, D. aromatic group of the formula

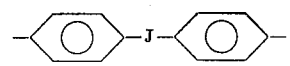

wherein J is oxygen, sulfur, alkylene of 1 to 12 carbons, alkylidene, including polyhaloalkylidene, of 2 to 13 carbons, and phenylene, and the rings may be substituted with halogen, E. group corresponding to the formula in (D) except that one or both of the depicted rings is fully hydrogenated, and

F.

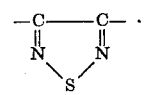

The polymers of the invention are thermoplastic solids which are readily fabricated into thin coatings and molded objects, and can be made as films or strong fibers by conventional solution spinning, solvent casting and/or melt spinning techniques. The films can be used for packaging purposes and the fibers can be employed in woven or non-woven fabrics. The polymers are thermally stable and range from relatively high melting point. When higher melting, they have high glass transition temperatures, and are self-extinguishing after direct exposure to a flame. They are insoluble in water, lower aliphatic alcohols, lower aliphatic ketones and aliphatic hydrocarbons, but are variously soluble in phenols (e.g., m-cresol), dimethylformamide, dimethylacetamide, hexamethylphosphoramide, N-methylpyrrolidone, 2,4-dimethylsulfolane; polyhalogenated solvents such as chloroform and hexafluoroisopropanol, and concentrated sulfuric acid.

The polymers are prepared by condensation polymerization from suitable 3,4-difunctionally-substituted 1,2,5-thiadiazoles and difunctional coreactants such as glycols, dicarbonyl halides and diisocyanates. As will be obvious to those skilled in the art, mixed polymers can be prepared using three or more direactive components as desired to produce various ratios of copolymer components.

The known disubstituted 1,2,5-thiadiazoles that can be used directly in forming polymers or indirectly through conversion to suitable intermediate derivatives are the 3,4-dicarboxylic acid, the 3,4-dicarbonyl chloride, the dimethyl 3,4-dicarboxylate, the 3,4-dicarbonitrile, the 3,4-dichloro derivative, the 3,4-dihydroxy compound and the 3-hydroxy-4-carboxylic acid.

PREFERRED EMBODIMENTS OF THE INVENTION

More detailed information on reaction conditions and alternatives is given in the following Examples which are illustrative and not limitative.

EXAMPLE 1

Preparation of a 1,2,5-thiadiazole polyester from a hydroxy acid via the acid chloride in situ

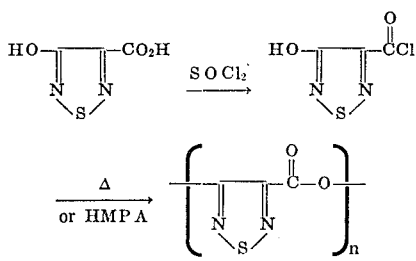

HMPA = hexamethylphosphoramide

A. A mixture of 17.6 g. of 3-hydroxy-1,2,5-thiadiazole-4-carboxylic acid and 260 ml. of thionyl chloride was refluxed under anhydrous conditions for 3.5 hours. The resulting solution was first heated under distilling conditions at atmospheric pressure to remove most of the thionyl chloride and then at 98°C./0.05 mm. for 2 hours to remove all volatile constituents. A pale green transparent glassy product remained. This was triturated with anhydrous ether to leave 8.2 g. of polymer as a white powder exhibiting a melting point of 283°C. and an inherent viscosity of 0.65 in dimethylacetamide at 25°C.

Infrared spectra of this polyester show carbonyl, ester —C—O—C—, and conjugated unsaturation absorption corresponding to the polyester structure

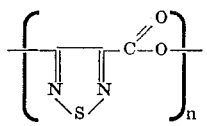

B. In a similar experiment 5 g. of 3-hydroxy-1,2,5-thiadiazole-4-carboxylic acid, 75 ml. of thionyl chloride, and 1.5 ml. of hexamethylphosphoramide were stirred together under nitrogen for 1.5 hours at ambient temperature, then refluxed for 3 hours. The system was filtered with a sintered glass Buchner funnel, and the white precipitate was washed on the filter with pentate and vacuum oven-dried at 50°C. to give 2.1 g. of 1,2,5-thiadiazole polyester. The polymer exhibited a glass transition temperature of 155°C., a melting point of 287°C., and an inherent viscosity of 0.3 in hexamethylphosphoramide at 25°C.

Anal. Calcd. for $C_3O_2N_2S$: C, 28.12; H, O; N, 21.88; S, 25.00

Found: C, 28.01; H, O; N, 21.62; S, 24.91.

The polymerization procedures of this example demonstrate methods for removing HCl by heat (part A) and by an acid acceptor (part B). The procedures may be modified by using inert solvent media such as ether, chloroform, dioxane and tetrahydrofuran, or by using other HCl acceptors such as dimethylformamide, dimethylacetamide, pyridine, quinoline and calcium hydroxide. The method of part B can also be modified by withholding the HCl acceptor until after excess thionyl chloride has been removed, as in the first stage of part A.

EXAMPLE 2

Preparation of 1,2,5-thiadiazole polyester from a hydroxy acid via the isolated acid chloride

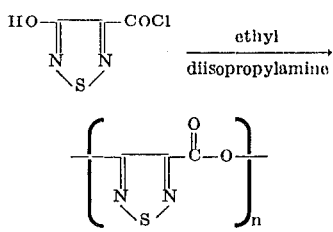

During the thermal polymerization at 98°C./0.05 mm. in Example 1, there was obtained 0.9 g. of white sublimate in the still head. This product was identified to be 3-hydroxy-1,2,5-thiadiazole-4-carbonyl chloride, melting at 105°–118°C. (resublimed m.p. 107.5° – 108°C.).

Anal. Calcd. for $C_3HO_2NSCl$:
C, 21.88; H, 0.64; N, 17.03; Cl, 21.58
Found: C, 22.49; H, 0.76; N, 15.90; Cl, 21.40.

Infrared absorption shows OH, acid chloride carbonyl, and C=N.

A mixture of 0.1 g. (0.0006 mole) of the above 3-hydroxy-1,2,5-thiadiazole-4-carbonyl chloride and 2.5 ml. of 2,4-dimethylsulfolane was stirred at room temperature under nitrogen to dissolve the acid chloride, and 0.1 ml. (0.0006 mole) of ethyl diisopropylamine was then added. After 27 hours' stirring a white precipitate which had formed was filtered, washed with water and acetone, and dried at 50°C./1 mm. overnight to give 0.01 g. of white 1,2,5-thiadiazole-3,4-polyester of inherent viscosity 1.08 in dimethylacetamide at 25°C.

The procedure of this example can be modified by changing the temperature, which suitably can be in the range —78°C. to 200°C. The time of polymerization varies from a few minutes to over a day according to the temperature, shorter times being sufficient at higher temperature. Solvents are desirable and many are suitable, e.g., chloroform, other halogenated hydrocarbons, dimethylformamide, dimethylacetamide, sulfolane, hexamethylphosphoramide and N-methylpyrrolidone. Other acid acceptors as described in Example 1 may be used.

EXAMPLE 3

Preparation of a 1,2,5-thiadiazole polyester from a glycol and a dicarboxylic ester

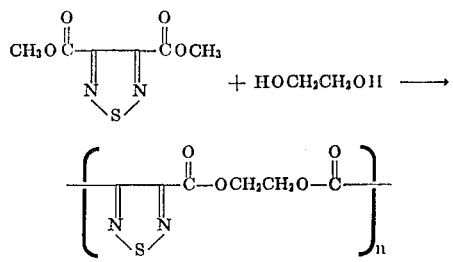

In a 35 mm. × 8 inch polymer tube were placed 8 g. (0.04 mole) of dimethyl 1,2,5-thiadiazole-3,4-dicarboxylate, 5.5 ml. (0.088 mole) of ethylene glycol (freshly distilled from calcium hydride) and 0.013 g. of tetraisopropyl titanate. The mixture was heated under nitrogen 3.5 hours at 180°C. to distill off the methanol and form the glycol ester. With the temperature maintained at 180°C., the pressure was gradually reduced to 1.1 mm. over an additional period of 40 minutes, after which the contents of the tube was a brown viscous mass. Heating under vacuum was continued for an additional 40 minutes. The vacuum was released by slowly introducing nitrogen, and the tube was allowed to cool. The tube was then broken to allow removal of the dark, hard plug of polymer. This was dissolved in 30 ml. of hexafluoroisopropanol, and the dark viscous solution was pressure filtered then stirred into 300 ml. of water. A very light tan precipitate was formed. The solid was isolated on a filter, washed well with water and acetone, and dried in a vacuum oven at 80°C./5 mm. overnight to give 4.9 g. of poly(ethylene 1,2,5-thiadiazole-3,4-dicarboxylate) melting at 193°C. and exhibiting an inherent viscosity of 0.2 in hexafluoroisopropanol at 25°C.

Anal. Calcd. for $C_6H_4O_4N_2S$: C, 36.00; H, 2.00; N, 14.00; S, 16.00

Found: C, 36.53; H, 2.45; N, 13.99; S, 16.04.

Infrared spectra of this polymer show saturated C—H, carbonyl, ester —C—O—C—, and conjugated unsaturation absorption corresponding to the polyester structure shown above.

The polyester formation described in this example may be varied by starting with other esters, such as the diphenyl ester of 1,2,5-thiadiazole-3,4-dicarboxylic acid. The procedure is also applicable to other diols, e.g., polymethylene glycols of the formula $HO(CH_2)_nOH$ where n is an integer of 2–20; phenylene diols of the formula

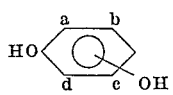

wherein the substituents a, b, c and d may be variously hydrogen, alkyl, aryl, alkoxy (preferably methoxy), halogen, nitro or nitrile, and the hydroxyl groups may be positioned ortho, meta or para to each other; cyclohexylene diols corresponding to the formula

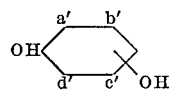

wherein the ring is saturated and the substituents $a'$, $b'$, $c'$ and $d'$ may be hydrogen, alkyl, cycloalkyl, alkoxy or halogen and the hydroxyl groups may be positioned ortho, meta or para to each other; aromatic diols of the formula

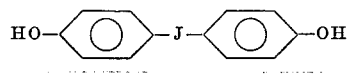

wherein J may be oxygen, sulfur, alkylene of 1 to 12 carbons, alkylidene, including polyhaloalkylidene, of 2 to 13 carbons, and phenylene, and the rings may be substituted (especially with halogen); and diols corresponding to the above aromatic diols wherein one or both of the depicted aromatic rings may be fully hydrogenated. As will be known to those skilled in the art, the properties of the novel polymers that contain substituted cyclohexylene or phenylene rings will be substantially the same as the properties of the polymers that contain unsubstituted cyclohexylene or phenylene rings.

EXAMPLE 4

Preparation of a polyester from an aromatic diol and 1,2,5-thiadiazole-3,4-dicarbonyl chloride

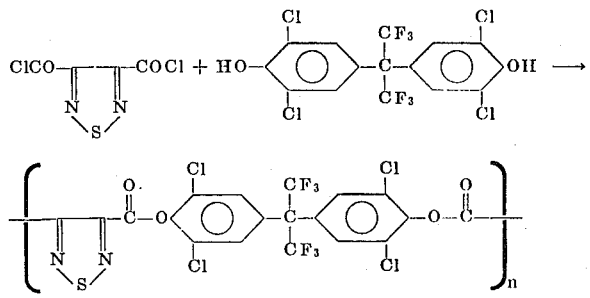

A solution of 5.275 g. (0.025 mole) of 1,2,5-thiadiazole-3,4-dicarbonyl chloride in 25 ml. of alcohol-free, anhydrous chloroform was added rapidly to a system composed of 11.850 g. (0.025 mole) of 1,1,1,-3,3,3-hexafluoro-2-bis(3,5-dichloro-4hydroxyphenyl)-propane, 10 ml. (0.050 mole) of 5N aqueous sodium hydroxide solution, 100 ml. of water, 0.5 g. of sodium lauryl sulfate (Duponal ME) and 25 ml. of alcohol-free chloroform being stirred rapidly in an ice-water-cooled, jacketed blender. Rapid stirring was continued for 5 minutes. The initial temperature was 6.5°C. and the final temperature 28°C. The system was poured into a large beaker and heated on a steam bath to remove chloroform and coagulate the polymer. The coagulum was washed with water four times in a blender and dried at 80°C./5 mm. overnight to give 12.2 g. of polyester exhibiting a glass transition temperature of 165°C., a melting point of 197°–213°C., and an inherent viscosity of 0.12 in m-cresol at 25°C.

Anal. Calcd. for $C_{19}H_4Cl_4F_6O_4N_2S$: S, 5.23

Found: S, 5.06.

Infrared spectra of the polymer show carbonyl, ester —C—O—C—, unsaturated C—H and conjugated cyclic —C=C and —C=N, corresponding to the polyester structrue shown above.

The interfacial condensation process of this example can be varied with respect to the solvent employed, the reaction temperature, the emulsifying agent and the acid acceptor. The organic solvent can be a halocarbon (methylene chloride, carbon tetrachloride, dichloroethane, tetrachloroethane, etc.), an aliphatic or aromatic hydrocarbon (hexane, cyclohexane, toluene, etc.), an ether (diethyl ether, dioxane, tetrahydrofuran, etc.) or other inert solvent. The temperature can be in the range −80°C. to +100°C., but is preferably about 0°–10°C. The emulsifying agent can be any of the well-known ionic or nonionic surface-active agents, such as the alkali metal sulfates of aliphatic alcohols containing from 8–18 carbon atoms, the higher fatty alcohols themselves, higher fatty alcohol esters, alkylaryl sulfonates, sodium petroleum sulfonate, higher fatty quaternary ammonium salts, higher polyether alcohols, etc. The acid acceptor can be an alkali carbonate (sodium or potassium carbonate or an organic base (piperazine, dimethylpiperazine, pyridine, other tertiary amines, etc.)

Any of the aromatic diols mentioned in reference to Example 3 can be used in the process of Example 4.

EXAMPLE 5

Preparation of a 1,2,5-thiadiazole poly(amide-urethane)

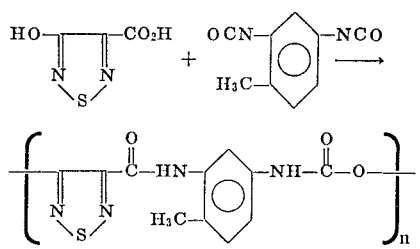

A solution of 4.969 g. (0.0340 mole) of 3-hydroxy-1,2,5-thiadiazole-4-carboxylic acid and 5.915 g. (0.0340 mole) of toluene-2,4-diisocyanate in 45 ml. of N-methylpyrrolidone was heated under nitrogen at 125°C. for 25 hours, at which point carbon dioxide evolution had practically ceased. The dark solution was poured into methanol, and the resulting precipitate was washed on the filter several times with methanol and dried at 80°C./5 mm. overnight to give 3.1 g. of poly(amideurethane) exhibiting a glass transition temperature of 174°C., a gradient bar stick temperature of 273°C., and an inherent viscosity of 0.15 in m-cresol at 25°C.

Anal. Calcd. for $C_{11}H_8O_3N_4S$: C, 47.85; H, 2.90; N, 20.28.

Found: C, 52.93; H, 4.20; N, 19.20. 52.79 4.41 19.04

Infrared spectra show NH, carbonyl, and conjugated unsaturation.

EXAMPLE 6

Preparation of a 1,2,5-thiadiazole polyether

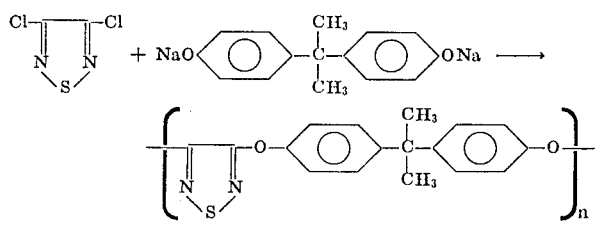

A solution of 3,264 g. (0.021 mole) or 3,4-dichloro-1,2,5-thiadiazole and 5.712 g. (0.021 mole) of the disodium salt of 2,2-bis(4,4'-hydroxyphenyl)propane in 50 ml. of anhydrous 2,4-dimethysulfolane was heated and stirred under nitrogen at 115°C. for 4 hours, at which point a sample of the reaction mixture was poured into methanol. A precipitate of polymer was formed. The polymer was dissolved in chloroform and cast from the solution onto glass to give a tough, transparent, strongly adherent coating. The polymer exhibited a metal block stick temperature of 150°C.

Anal. Calcd. for $C_{17}H_{14}O_2N_2S$: C, 65.80; H, 4.51; N, 9.03.

Found: C, 64.59; H, 4.33; N, 8.48.

Infrared spectra of this polymer show ether, and conjugated cyclic C=C and C=N.

A portion of the original reaction mixture heated an additional 2 hours at 150°C. yielded polymer which exhibited an inherent viscosity of 0.14 in m-cresol at 25°C. and gave a negative copper oxide flame test for chlorine.

EXAMPLE 7

Preparation of a Polyester from an Aromatic Diol and 1,2,5-Thiadiazole-3,4-dicarbonyl chloride

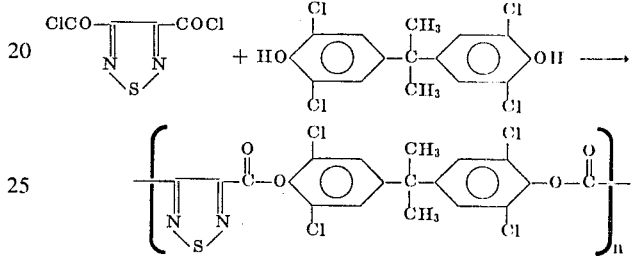

A solution of 10.55 g (0.05 mole) of 1,2,5-thiadiazole-3,4-dicarbonyl chloride in 120 ml of 1,1,2-trichloroethane was added rapidly to a system composed of 18.30 g (0.05 mole) of 2-bis(3,5-dichloro4-hydroxyphenyl)-propane, 50 ml (0.10 mole) of 2N sodium hydroxide, 415 ml of water, 40 ml of aqueous (10%) of sodium lauryl sulfate (Duponol ME), and 4 g of tetraethylammonium chloride being stirred rapidly at 10°C. Rapid stirring was continued for 5 minutes as the temperature rose to 15°C. The white polyester was then coagulated by the addition of a liter of acetone. The separated polymer was washed in a blender three times with 500-ml portions of acetone, then seven times with 500-ml portions of a 1:1 water:ethanol mixture with 250-ml rinses on a filter between washes, and finally with 500 ml of acetone, then 500 ml of ethanol with 250-ml rinses of each. Drying was carried out in a vacuum oven at 80°C/5 mm overnight. The dry polymer (18.0 g) showed a gradient bar stick temperature of 245°C, an inherent viscosity of 0.51 (0.5% in sym-tetrachloroethane, 30°C) and a number average molecular weight of 12,400 (in N-methylpyrrolidone). A clear, tough film cast from a 12% by weight solution in chloroform showed an initial modulus of 200,000 psi and a tensile strength of 5,120 psi at 3% elongation. The film was flame-resistant, showing no ignition in air and an LOI of 0.495 (LOI = limited oxygen index, a minimum oxygen/nitrogen ratio required for ignition). An attractive, colorless yarn was prepared by spinning the polymer from a 30.4% solution in sym-tetrachloroethane.

The polymer showed infrared absorption consistent with the above-indicated polyester structure: aromatic C—H at 3.24 $\mu$, saturated C—H at 3.32 $\mu$ and 3.42 $\mu$, carbonyl at 5.62 $\mu$, aromatic unsaturation at 6.28 $\mu$ and 6.38 $\mu$, and ester C—O—C linkage at 8.05 $\mu$.

EXAMPLE 8

A Polyester from 3,4-Dihydroxy-1,2,5-thiadiazole and 1,2,5-Thiadiazole-3,4-dicarbonyl Chloride

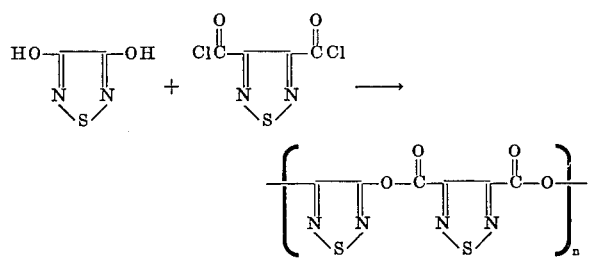

In a micro reactor with a paddle stirrer, there were mixed 0.118 g (0.001 mole of 3,4-dihydroxy-1,2,5-thiadiazole, 2 ml of 1N sodium hydroxide (0.002 mole), 8 ml of water, 0.08 g of tetraethylammonium chloride and 1 ml of alcohol-free chloroform. As the system was stirred rapidly in an ice-bath, there was added a solution of 0.211 g (0.001 mole) of 1,2,5-thiadiazole-3,4-dicarbonyl chloride in 3 ml of anhydrous, alcohol-free chloroform. Chloroform (1 ml) was used to rinse the last traces of solution on the walls of the container into the reactor. A yellow color developed which then disappeared as stirring was continued for 10 minutes. The solvents were evaporated under the reduced pressure of a water aspirator and the residual solid polymer was washed five times with 25-ml portions of water, then dried at 80°C/1 mm overnight. The dried polymer weighed 0.07 g. It was soluble in dimethylacetamide and insoluble in chloroform. The infrared absorption of the polymer had broad and diffuse polymeric bands which included an ester carbonyl at 5.86 μ.

The embodiments of the invention in which an exclusive property or privilege is claimed are defined as follows:

1. A fiber- and film-forming polymeric 1,2,5-thiadiazole consisting essentially of recurring units of the formula

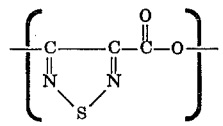

2. The polymer of claim 1 in the form of a self-supporting film.

3. The polymer of claim 1 in the form of a fiber.

* * * * *

UNITED STATES PATENT AND TRADEMARK OFFICE
CERTIFICATE OF CORRECTION

PATENT NO. : 3,855,183

DATED : December 17, 1974

INVENTOR(S) : Robert Neal MacDonald

It is certified that error appears in the above-identified patent and that said Letters Patent are hereby corrected as shown below:

Column 1, line 35, the formula should read $$\begin{array}{c} -\underset{\underset{N^2}{\|}}{C_3}\!-\!\underset{\underset{{}_5 N}{\|}}{{}_4C}- \\ \diagdown_{\underset{S}{1}}\!\diagup \end{array}$$

Column 2, lines 45 and 46, "from relatively high melting point" should read --from relatively low to relatively high melting point--.

Column 3, line 54, "pentate" should read --pentane--.

Column 6, line 29, "4hydroxy" should read --4-hydroxy--.

Column 6, line 32, "Duponal" should read --"Duponol"--.

Column 7, line 38, "C, 52.93; H, 4.20; N, 19.20. 52.79 4.41 19.04" should read --C, 52.93; H, 4.20; N, 19.20.
52.79      4.41       19.04--

Column 7, line 57, "3,264" should read --3.264--.

Column 8, line 35, "dichloro4-" should read --dichloro-4- --

Signed and Sealed this seventh Day of October 1975

[SEAL]

Attest:

RUTH C. MASON
*Attesting Officer*

C. MARSHALL DANN
*Commissioner of Patents and Trademarks*